United States Patent
Hoover et al.

(10) Patent No.: US 10,919,707 B2
(45) Date of Patent: Feb. 16, 2021

(54) MARKING TRANSPORT CLEANING PAD

(71) Applicant: XEROX CORPORATION, Norwalk, CT (US)

(72) Inventors: Linn Hoover, Webster, NY (US); Jeffrey J. Bradway, Rochester, NY (US); Rachel Lynn Tanchak, Rochester, NY (US); Paul M. Fromm, Rochester, NY (US); Frank B. Tamarez Gomez, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 16/288,147

(22) Filed: Feb. 28, 2019

(65) Prior Publication Data
US 2020/0277146 A1    Sep. 3, 2020

(51) Int. Cl.
*B65G 45/12*    (2006.01)
*B08B 1/00*    (2006.01)
*B41J 13/08*    (2006.01)
*G03G 21/00*    (2006.01)

(52) U.S. Cl.
CPC .............. *B65G 45/12* (2013.01); *B08B 1/005* (2013.01); *B08B 1/006* (2013.01); *B08B 1/008* (2013.01); *B41J 13/08* (2013.01); *G03G 21/0017* (2013.01); *G03G 21/0041* (2013.01); *G03G 21/0076* (2013.01); *G03G 2221/001* (2013.01)

(58) Field of Classification Search
CPC ......... B65G 45/12; B08B 1/005; B08B 1/006; B08B 1/008; B41J 13/08; G03G 21/0017; G03G 21/0041; G03G 21/0076; G03G 2221/001
See application file for complete search history.

(56) References Cited

U.S. PATENT DOCUMENTS

| | | | |
|---|---|---|---|
| 6,679,601 B1 * | 1/2004 | Pham | B41J 11/007 134/6 |
| 7,901,030 B2 * | 3/2011 | Miyata | B41J 11/007 347/103 |
| 2005/0168515 A1 * | 8/2005 | Nagai | B41J 3/4078 347/23 |
| 2005/0168521 A1 * | 8/2005 | Suzuki | B41J 29/17 347/33 |
| 2007/0146416 A1 * | 6/2007 | Nakashima | B41J 2/16552 347/33 |
| 2011/0293316 A1 * | 12/2011 | Sato | G03G 21/12 399/101 |
| 2020/0277146 A1 * | 9/2020 | Hoover | G03G 21/0076 |

* cited by examiner

*Primary Examiner* — Sharidan Carrillo
(74) *Attorney, Agent, or Firm* — Ortiz & Lopez, PLLC; Luis M. Ortiz; Kermit D. Lopez

(57) ABSTRACT

A cleaning pad can be attached onto an inner surface of a transport belt so the cleaning pad can move with the transport belt along hardware of a marking system, including support rollers and a marking platen to remove ink from the marking platen and support rollers of the rendering device as the transport belt cycles through its typical path within the rendering system.

9 Claims, 9 Drawing Sheets

MARKING TRANSPORT CLEANING PAD

TECHNICAL FIELD

Embodiments are generally related to the field of rendering devices, such as printers and photocopiers. Embodiments are further related to the field of rendering device maintenance. Embodiments are also related to methods, systems, and devices for cleaning components in rendering devices. Embodiments also relate to marking platens, transport belts and support rollers utilized in printing systems. Embodiments are additionally related to cleaning devices used to clean marking platens, support rollers and other marking belt transport hardware.

BACKGROUND

Printing remains a critically important function in the modern workplace and home alike. Printers, and in particular ink jet printers, are commonly used for business applications and for simple home printing applications. Printing systems known in the document reproduction arts can apply a marking material, such as ink or toner, onto a substrate such as a sheet of paper, a textile, metal, plastic and objects having a non-negligible depth such as a coffee cup, bottle, and the like.

In large ink jet printers that employ vacuum belt transports, the support rollers and marking platens (also vacuum plenums) can become contaminated with ink and debris. Such fouling can lead to system faults such as motion quality errors and paper handling issues. Currently, the transport belt must be periodically removed from the printer so that technicians can access the marking platens and support rollers for their cleaning. This leads to system downtime and increases the risk of damage to components. As the size of the transport components increase, these problems quickly become unmanageable.

A printing system can perform printing of an image or the like on sheets of paper, for example, by transporting a sheet of paper (or other substrates), which is an example of a medium, up to a position of a printing section using a transport roller, and an endless form transport belt (also referred to as a "marker belt"), which can rotate while coming into contact with the sheet of paper, and discharging ink, which is an example of a liquid, toward the sheet of paper from a liquid discharging head. When ink, which is discharged from the liquid discharging head, becomes attached to the outer surface of the transport belt, there is a concern that the ink can also be transferred to sheets of paper that are transported by the transport belt, and that the sheets of paper will be stained.

Photoreceptor belts, used in certain printing applications, can also become contaminated with ink together with marking platens and support rollers. Ink contamination can lead to loss of belt tracking, velocity errors, and paper jams. Once again, the current solution is to remove the belt from the rendering device, clean it, and then reinstall it in the machine. This becomes particularly vexatious as rendering devices are scaled to accommodate larger paper sizes. Larger marker transports make the feasibility of belt removal for cleaning less practical.

Accordingly, very wide and long marker vacuum transport belts become difficult to handle when cleaning rendering system components. There is a need in the art for methods and systems that facilitate in-situ cleaning solutions as described in the embodiments disclosed herein. What are needed are systems and methods to clean the marking platen and support rollers while a transport belt remains installed in a rendering device.

BRIEF SUMMARY

The following summary is provided to facilitate an understanding of some of the innovative features unique to the disclosed embodiments and is not intended to be a full description. A full appreciation of the various aspects of the embodiments disclosed herein can be gained by taking the entire specification, claims, drawings, and abstract as a whole.

It is, therefore, one aspect of the disclosed embodiments to provide a method, system, and apparatus for rendering device maintenance.

It is another aspect of the disclosed embodiments to provide a method, system, and apparatus for printer maintenance and cleaning.

It is another aspect of the disclosed embodiments to provide a method, system, and apparatus for cleaning support rollers for transport belts and marking platens, vacuum plenums and associated components.

The aforementioned aspects and other objectives and advantages can now be achieved as described herein. A system for cleaning support rollers and marking platens without removing the marker belt can be accomplished by affixing a cleaning pad to the inside surface of a transport belt and cycling the transport belt through its typical path within a rendering system to pull the pad over support rollers and across a top surface of a marker platen.

According to another feature of the embodiments, a cleaning pad can be provided that can include multiple absorbent pads sections along the length of the pad.

According to another feature of the embodiments, a cleaning pad can be provided that can include an elastomer blade along the length of the pad.

According to another feature of the embodiments, a cleaning pad can be configured to be attached to an inner surface of the transport belt and move along a path followed by the transport belt to remove ink from at least one of support rollers and a top surface of a marker platen typically contacted by the transport belt during operation within a rendering device, and include a means to attach the cleaning pad to the inner surface of the transport belt.

According to another feature of the embodiments, a cleaning pad includes a base sheet including a bottom surface and a top surface and further comprises protrusions extending from the bottom surface serving as the means to attach the cleaning pad to the inner surface of the transport belt, wherein the protrusions are configured to be attached to holes formed in the inner surface of the transport belt.

According to another feature of the embodiments, a base sheet of a cleaning pad includes a lead pad further comprising a rough texture formed as a surface over an absorbent pad material sandwiched between the rough texture and the base sheet.

According to another feature of the embodiments, a cleaning pad includes a base sheet having a bottom surface and a top surface and wherein the base sheet further comprises a scraping blade can be affixed to the top surface of the base sheet between a lead pad comprised of absorbent material and a second pad composed of more absorbent material that is adapted to accept cleaning fluid therein.

According to another feature of the embodiments, a cleaning pad includes a scraping blade comprising of a polyurethane material, wherein the scraping blade is mounted to the base sheet between a lead pad and a second pad.

According to another feature of the embodiments, a cleaning pad includes a drying pad located on a base sheet, just after placement of a second pad, wherein the drying pad is configured to wipe and dry components that a lead pad and the second pad contact with cleaning fluid.

According to another feature of the embodiments, a method for cleaning rendering machine hardware can include the steps of: attaching a cleaning pad including absorbent material onto an inside surface of the transport belt; moistening the absorbent material located on the cleaning pad; activating movement of the transport belt and the cleaning pad through the rendering system to cause the cleaning pad to make contact with rendering system hardware; stopping movement of the transport belt and the cleaning pad attached to the transport after cycling through hardware components of the rendering device including support rollers and a marking platen; and removing the cleaning pad from the transport belt after the cleaning pad and the transport belt are stopped.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION

Figure 1:
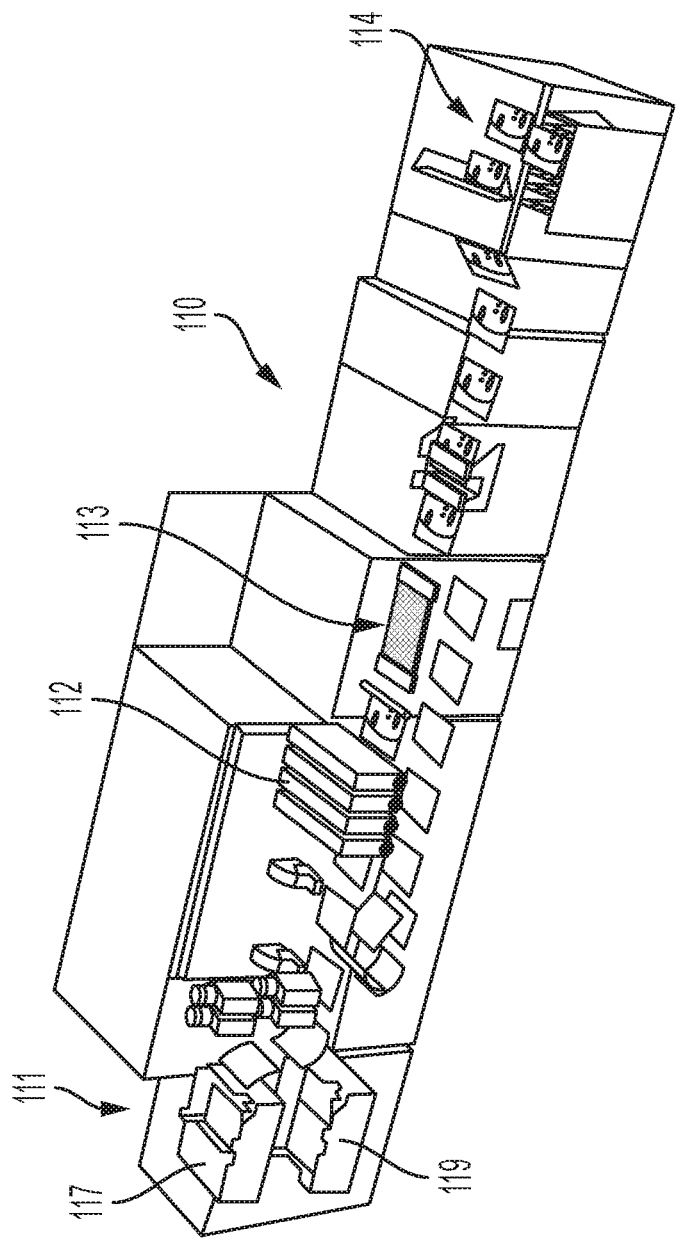
FIG. 1 illustrates a pictorial diagram depicting an example printing system in which an embodiment may be implemented.

The particular values and configurations discussed in these non-limiting examples can be varied and are cited merely to illustrate one or more embodiments and are not intended to limit the scope thereof.

Subject matter will now be described more fully herein after with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems/devices. Accordingly, embodiments may, for example, take the form of hardware, software, firmware or any combination thereof (other than software per se). The following detailed description is, therefore, not intended to be interpreted in a limiting sense.

Throughout the specification and claims, terms may have nuanced meanings suggested or implied in context beyond an explicitly stated meaning. Likewise, phrases such as "in one embodiment" or "in an example embodiment" and variations thereof as utilized herein do not necessarily refer to the same embodiment and the phrase "in another embodiment" or "in another example embodiment" and variations thereof as utilized herein may or may not necessarily refer to a different embodiment. It is intended, for example, that claimed subject matter include combinations of example embodiments in whole or in part.

In general, terminology may be understood, at least in part, from usage in context. For example, terms, such as "and", "or", or "and/or" as used herein may include a variety of meanings that may depend, at least in part, upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein, depending at least in part upon context, may be used to describe any feature, structure, or characteristic in a singular sense or may be used to describe combinations of features, structures, or characteristics in a plural sense. Similarly, terms such as "a", "an", or "the", again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context. Additionally, the term "step" can be utilized interchangeably with "instruction" or "operation".

Unless defined otherwise, all technical and scientific terms used herein have the same meanings as commonly understood by one of ordinary skill in the art. As used in this document, the term "comprising" means "including, but not limited to."

The term "printing system" as utilized herein can relate to a printer, including digital printing devices and systems that accept text and graphic output from a computing device, electronic device or data processing system and transfers the information to a substrate such as paper, usually to standard size sheets of paper. A printing system may vary in size, speed, sophistication, and cost. In general, more expensive printers are used for higher-resolution printing. A printing system can render images on print media, such as paper or other substrates, and can be a copier, laser printer, book-making machine, facsimile, or a multifunction machine (which can include one or more functions such as scanning, printing, archiving, emailing, faxing and so on). An example of a printing system that can be adapted for use with one or more embodiments is shown in FIG. 1.

The term "transport belt" as utilized herein can relate to a belt implemented in a printing system in association in with a rotatable member such as a roller or other transport members or web transport configurations. Such a transport belt can also be referred to as a "marker belt" and related to marking transport or marker transport, which may become contaminated with aqueous ink. To permit a high registration accuracy, a printing system can employ such a transport belt, which in some implementations can pass in front of toner cartridges and each of the toner layers can be precisely applied to the transport belt. The combined layers can be then applied to the paper in a uniform single step. It should be appreciated, however, that the disclosed embodiments are not limited to printers that utilize toner. Ink and other types of marking media may be utilized in other printing embodiments. That is, a printing system is not limited to a laser printing implementation but may be realized in other contexts, such as ink-jet printing systems. All printing system can be subject to contamination by debris and ink.

FIG. 1 illustrates a pictorial diagram depicting an example printing system 110 in which an embodiment may be implemented. In some embodiments, the printing system 110 can be implemented as an aqueous inkjet printer. The printing system 110 shown in FIG. 1 can include a number of sections or modules, such as, for example, a sheet feed module 111, a print head and ink assembly module 112, a dryer module 113 and a production stacker 114. Such modules can be composed of physical hardware components, but in some cases may include the use of software or may be subject to software instructions.

It should be appreciated that the printing system 110 depicted in FIG. 1 represents one example of an aqueous inkjet printer that can be adapted for use with one or more embodiments. As previously stated, the particular configuration and features shown in FIG. 1 should not be considered limiting features of the disclosed embodiments. That is, other types of printers can be implemented in accordance with different embodiments. For example, the printing system 110 depicted in FIG. 1 can be configured as a printer that uses water-based inks or solvent-based inks, or in some cases may utilize toner ink in the context of a LaserJet printing embodiment.

In an embodiment, the sheet feed module 111 of the printing system 110 can be configured to hold, for example, 2,500 sheets of 90 gsm, 4.0-caliper stock in each of two trays. With 5,000 sheets per unit and up to 4 possible feeders in such a configuration, 20,000 sheets of non-stop production activity can be facilitated by the printing system 110. The sheet feed module can include an upper tray 17 that holds, for example, paper sizes 8.27"×10"/210 mm×254 mm to 14.33"×20.5"/364 mm×521 mm, while a lower tray 19 can hold paper sizes ranging from, for example, 7"×10"/178 mm×254 mm to 14.33"×20.5"/364 mm×521 mm. Each feeder can utilize a shuttle vacuum feed head to pick a sheet off the top of the stack and deliver it to a transport mechanism.

The print head and ink assembly module 112 of the printing system 110 can include, for example a plurality of inkjet print heads that deliver four different drop sizes through, for example, 7,870 nozzles per color to produce prints with, for example, a 600×600 dpi. An integrated full-width scanner can enable automated print head adjustments, missing jet correction and image-on-paper registration. Operators can make image quality improvements for special jobs such as edge enhancement, trapping, and black overprint. At all times automated checks and preventative measures can maintain the press in a ready state and operational.

The dryer module 113 of the printing system 110 can include a dryer. After printing, the sheets can move directly into a dryer where the paper and ink are heated with seven infrared carbon lamps to about 90° C. (194° F.). This process removes moisture from the paper so the sheets are stiff enough to move efficiently through the paper path. The drying process also removes moisture from the ink to prevent it from rubbing off. A combination of sensors, thermostats, thermistors, thermopiles, and blowers accurately heat these fast-moving sheets, and maintain rated print speed.

The production stacker 114 can include a finisher that can run over a period of time as it delivers up to 2,850 sheets at a time. Once unloaded, the stack tray can return to a main stack area to pick and deliver another load. The stacker 114 can provide an adjustable waist-height for unloading from, for example, 8" to 24", and a by-pass path with the ability to rotate sheets to downstream devices. The production stacker 114 can also be configured with, for example, a 250-sheet top tray for sheet purge and samples, and can further include an optional production media cart to ease stack transport. One non-limiting example of printing system 110 is the Xerox® Brenva® HD Production Inkjet Press, a printing product of Xerox Corporation. Such a printing system can include transport members such as the transport belts discussed herein and/or other features including for example a Brenva®/Fervent® marking transport, which is also a product of Xerox Corporation.

Figure 2:
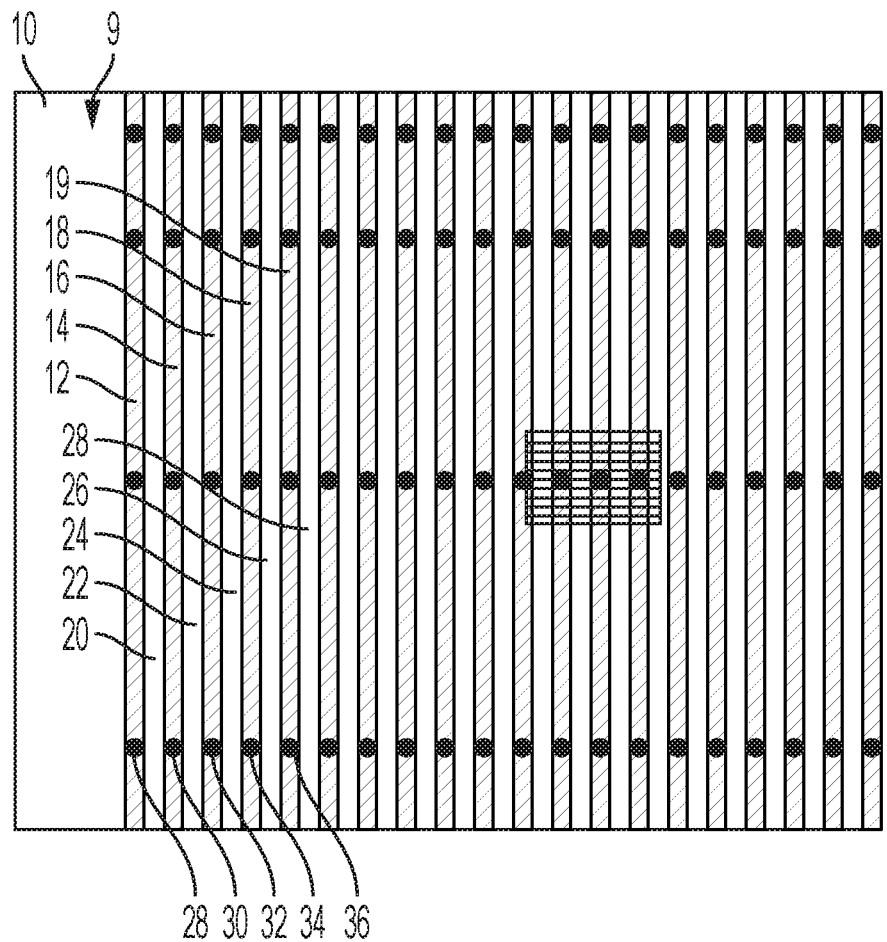
FIG. 2 illustrates a screen shot of the top view of a marker platen, in accordance with an embodiment.

FIG. 2 illustrates a screen shot of the top view of a marker platen 10, in accordance with an embodiment. As shown in FIG. 2 the marker platen 10 has a top surface 9 that can include a vacuum channel 12, a vacuum channel 14, a vacuum channel 16, a vacuum channel 18, and a vacuum channel 19. The marker platen 10 can further include on its top surface 9 one or more landing areas including a landing area 20, a landing area 22, a landing area 24, a landing area 26, and a landing area 28, and so on where a transport belt 39 (shown in FIG. 3) can ride. The marker platen 10 can also include one or more vacuum ports formed into/through the top surface 9 including a vacuum port 28, a vacuum port 30, a vacuum port 32, a vacuum port 34, and a vacuum port 36, and so on, which can feed the vacuum channel 12, the vacuum channel 14, the vacuum channel 16, the vacuum channel 18, the vacuum channel 19 and so on. It can be appreciated that additional or fewer vacuum channels, landing areas and vacuum ports can be implemented, and that any specific number of such vacuum channels, landing areas and vacuum ports are not limiting features of the disclosed embodiments.

Figure 3:
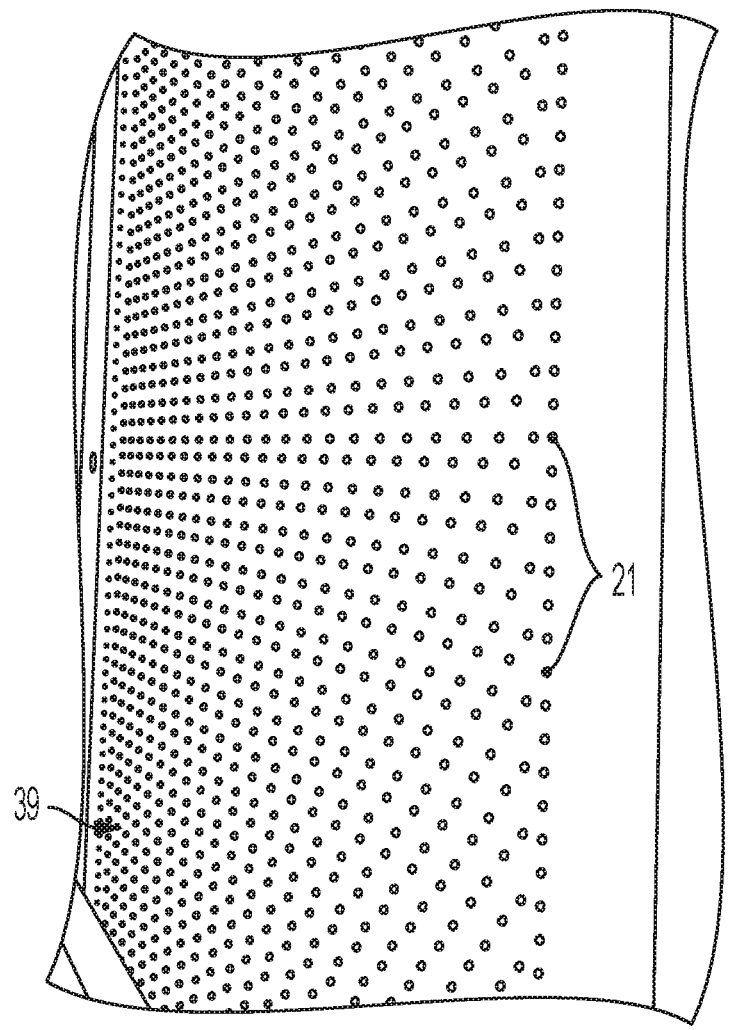
FIG. 3 illustrates a photograph of a transport belt, in accordance with an embodiment.

FIG. 3 illustrates a photograph of a transport belt 39, in accordance with an embodiment. A transport belt 39 is pliable, is typically continuous and moves along support wheels located at each end of the platen 10. The transport belt can be made from pliable materials that can include polyester. The transport belt 39 (marker belt) can ride on the top surface 9 of the marker platen 10, and can be configured with vacuum holes 21 spaced periodically throughout the transport belt 39, and which can be aligned with the vacuum channels (i.e., 12/14/16/18/19) formed in the market platen 10.

Figure 4:
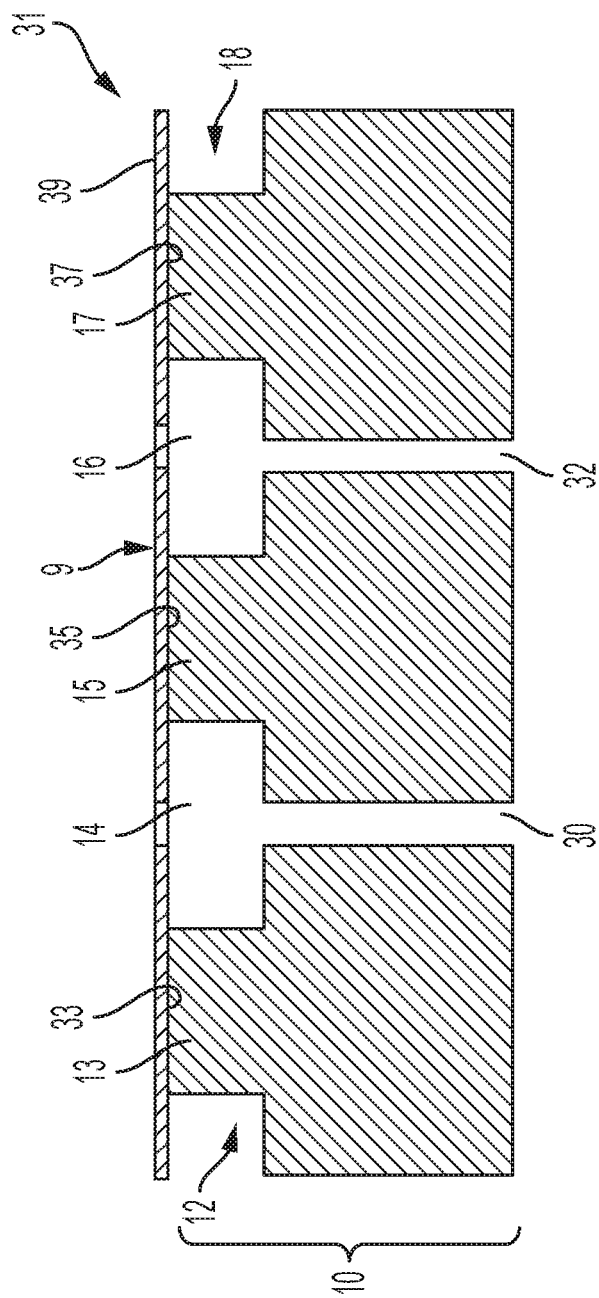
FIG. 4 illustrates a block diagram depicting a side sectional view of an apparatus that includes the marker platen and transport belt, in accordance with an embodiment.

FIG. 4 illustrates a block diagram depicting a side sectional view of a marking apparatus 31 that includes the marker platen 10 and the transport belt 39, in accordance with an embodiment. It can be appreciated that the apparatus 31 can be incorporated into a printing system. As shown in FIG. 2, the vacuum channel 12, the vacuum channel 14, the vacuum channel 16, the vacuum channel 18, and the vacuum channel 19 can be disposed below the transport belt 39. The apparatus 31 can include one or more guides including a topside (top surface 9) marker platen surface guide 13, a top surface marker platen surface guide 15, and a topside marker platen surface guide 17, which are all analogous to guides 20-28 in FIG. 2.

Figure 6A:
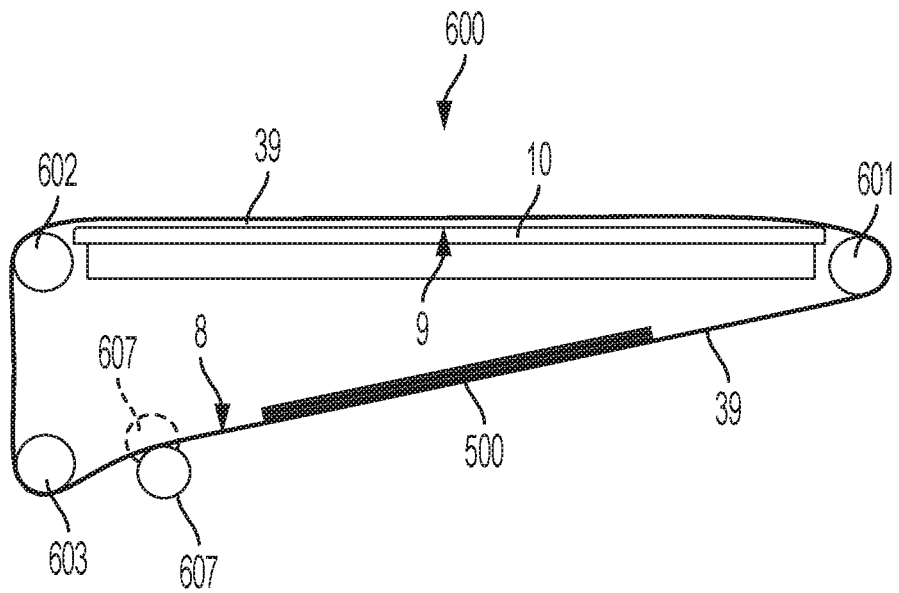
FIG. 6A-6F illustrates a block diagram depicting a side sectional view of an apparatus that includes a marking transport cleaning pad attached to a transport belt and cycling through a rendering system (e.g., copier/printer) to clean support rollers, platens and associated hardware in contact with transport or marker belt, in accordance with an embodiment.

Ink contamination areas can be located on the transport belt 39, on the support wheels 601/602/603, and along the top surface 9 of the marker platen 10, shown in FIG. 6A. Vacuum port 30 and a vacuum port 32 shown in FIG. 3 with respect to the vacuum channel 14 and the vacuum channel 16 are also susceptible to contamination. The contact areas between the transport belt 39 and the marker platen 10 may be the area most likely to suffer from ink contamination and can result in excessive frictional drag. The drag force on the marker platen 10, when contaminated with ink may follow a 'shark-fin' type pattern with respect to ink contaminant when drying. If a sheet of media jams in the paper path prior to passing under the print heads, ink contaminant can become freshly dispersed from the print head (not shown) of the printing system and onto the platen surface, Without the media the ink is jetted directly onto the marker belt in a low viscosity fluidic state. As a result the consequent drag force between the transport belt 39 and the marker platen 10 may be minimal.

As this ink contaminant experiences drying over an extended period of time, the water content in it decreases while the concentration of co-solvents and other high boiling additives (e.g. glycols) remains constant. Consequently, the ink contaminant may be more likely to behave like a high viscosity fluid during these times. Such circumstances can increase the drag force between the transport belt 39 and the marker platen 10 and may lead to drive force failure.

Figure 5A:
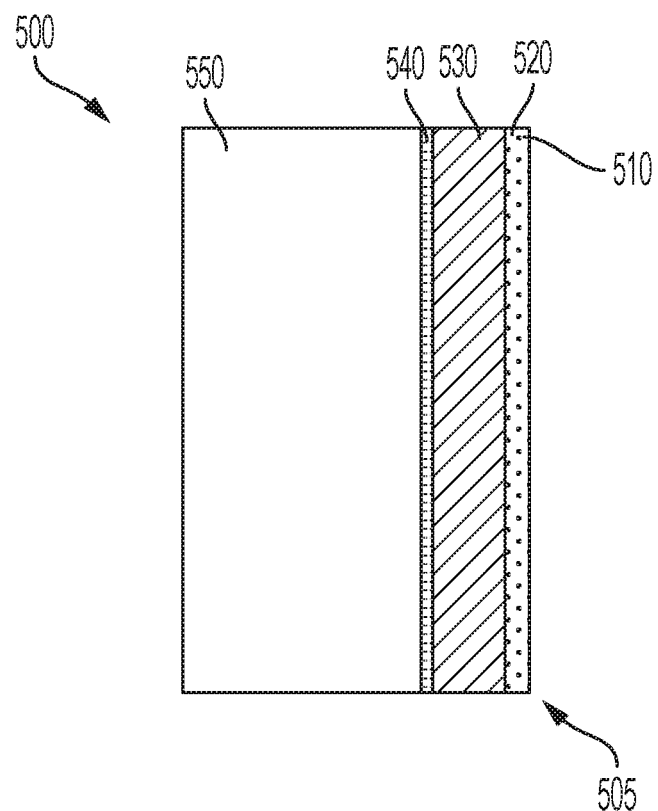
FIG. 5A illustrates a top view of marking transport cleaning pad that can include absorbent pads and scrappers, in accordance with an embodiment.
Figure 5B:
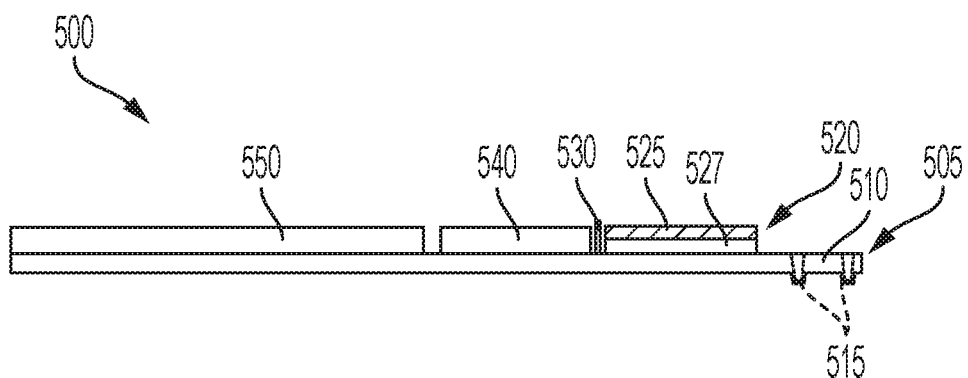
FIG. 5B illustrates a side view of the marking transport cleaning pad of FIG. 5A, in accordance with an embodiment.

The embodiments disclosed herein are drawn to methods and systems for cleaning components in a rendering device 600. Referring to FIGS. 5A-5B, a cleaning pad 500 can be attached to holes 21 formed in the transport belt 39. The cleaning pad 500 is designed so that it can move with the transport belt 39. The cleaning pad 500 can help remove ink from the top surface 9 of the marker platen 10, support wheels 615 as shown in FIG. 6, and other hardware components that may come into contact with the transport belt 39. The cleaning pad 500 can include a base sheet 510 made from a flexible plastic material (pliable material) and an absorbent pad material 527 that can contact hardware of the rendering system typically contacted by the transport belt 39. A leading edge of the base sheet 510 can be adhered to an inner surface of the transport belt 39. The leading edge can be taped to the inner surface 8 of the transport belt 39, or have an adhesive backing to hold it onto the inner surface 8 of the transport belt 39. Protrusions 515 extending from an underside of the base sheet 510 can also be provided on the leading edge of the base sheet 510 and can interface with holes 21 formed on the transport belt 39, thereby holding the cleaning sheet 39 to the inner surface 8 of the transport belt 39 as it moves through the rendering device 600.

The base sheet 510 can be composed of BoPET or other pliable material. BoPET (Biaxially-oriented polyethylene terephthalate, and also commercially known as Mylar) is a polyester film made from stretched polyethylene terephthalate (PET) and is used for its high tensile strength, chemical and dimensional stability, transparency, reflectivity, gas and aroma barrier properties, and electrical insulation. In one embodiment, the topside of the base sheet 510 can include absorbent pad material 527 along most of its surface. In an alternative embodiment, the topside of the base sheet 510 can include a lead pad 520 that can further include a rough texture 525 formed as a surface over an absorbent pad material 527 sandwiched between the rough texture 525 and the base sheet 510. The rough texture can be chosen from materials that will not scratch or damage data rendering system components. The absorbent material 527 can be chosen from soft materials similar to those used in cleaning sponges or cloths. A scraping blade 530 can be affixed to the base sheet 510 between the lead pad 520 and a second pad 540 composed of more absorbent material that can also accept cleaning fluid (not shown) therein. The scraping blade can be composed of a polyurethane material, or materials that will not damage data system rendering hardware. A drying pad 550 can be located on the base sheet 510, just after placement of the second pad 540. The drying pad 550 can wipe and dry components that the lead pad 520 and second pad 540 may contact with the cleaning fluid. The drying pad 550 can also remove debris and ink that can become loosened by the lead pad 520, the scraping blade 530, and the second pad 540.

In accordance with the first embodiment for cleaning pad 500, where absorbent pad material 527 can be attached to most of the base sheet 510, only a portion of the pad (e.g., ⅓) beginning at the leading edge of the base sheet can be moistened with cleansing solution. This would enable the remaining portion of the absorbent pad material 527 to dry hardware contacted by the cleaning pad 500 with the assistance of the transport belt 39. Such a simpler cleaning pad 500 design can still include the protrusions 515 extending from the base sheet 510 so that the cleaning pad 500 can be attached to holes 21 formed in the transport belt 39. Of course tape or adhesive can also be used to hold the cleaning pad 500 to the transport belt 39.

Referring to the system 600 in FIG. 6A, the cleaning pad 500 can be attached to the inner surface 8 of the transport belt 39 so that the cleaning pad 500 can move with the transport belt 39 along the support wheels 601/602/603, platen 10, and other hardware that may contact the transport belt 39. Protrusions 515 extending from the base sheet 510 of the cleaning pad 500, if this embodiment is used, can interface with holes 21 formed in the transport belt 39. A tensioning roller 607 used to tighten the transport belt 39 can be loosened (partially released) to lower transport belt tension in order to facilitate movement of the cleaning pad through the path of the transport belt 39 around support wheels and over the platen 10, and also to facilitate placement of the cleaning pad onto the inside of the transport belt 39.

Before the cleaning pad 500 is cycled with the transport belt 39 for a full revolution through its path in the data rendering system, absorbent pad material 527 can be moistened with cleaning solution. As mentioned before, where a simpler cleaning pad design is used that is only comprised of absorbent material, about ⅓ of the leading absorbent material can be moistened with cleaning solution. In a cleaning pad design that includes a lead pad 520, second pad 540 and drying pad 550, then at least one of the lead pad 520 and second pad 540 can be moistened with cleaning solution.

Figure 6B:
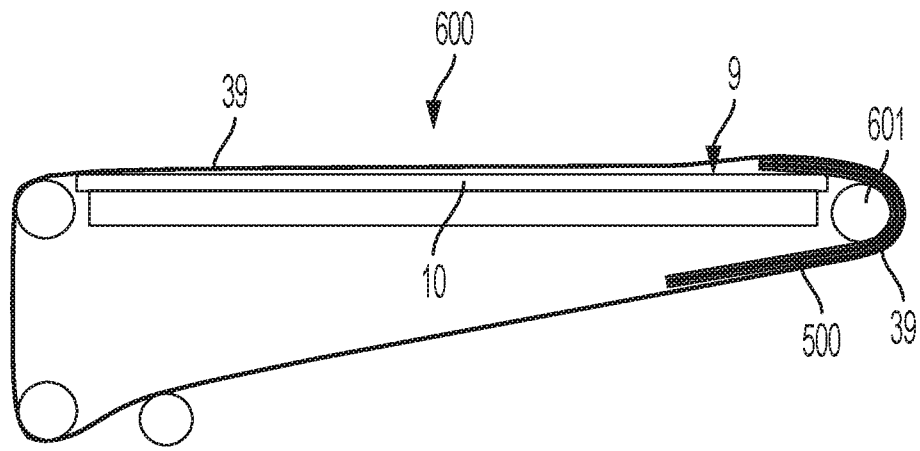
Figure 6C:
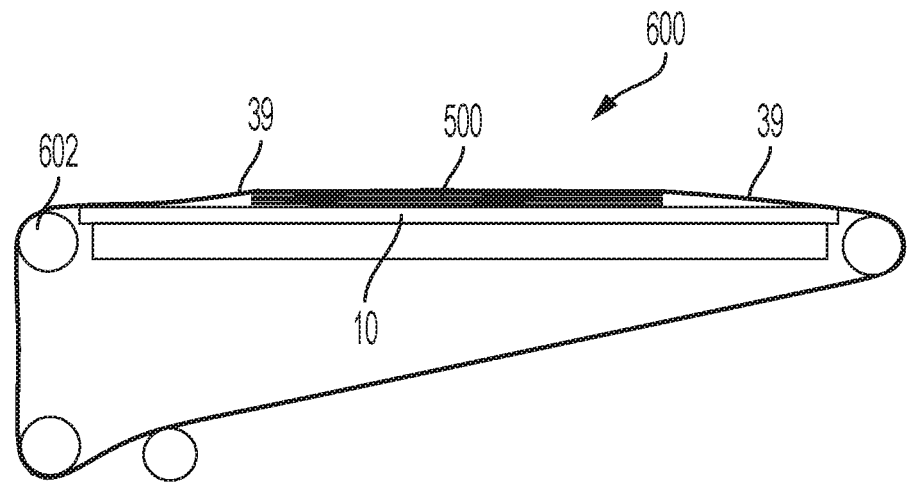
Figure 6D:
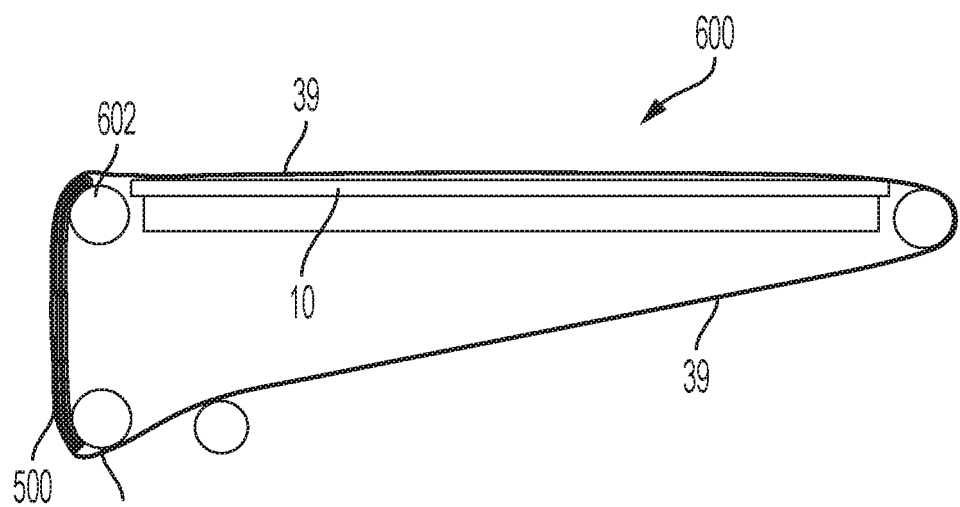
Figure 6E:
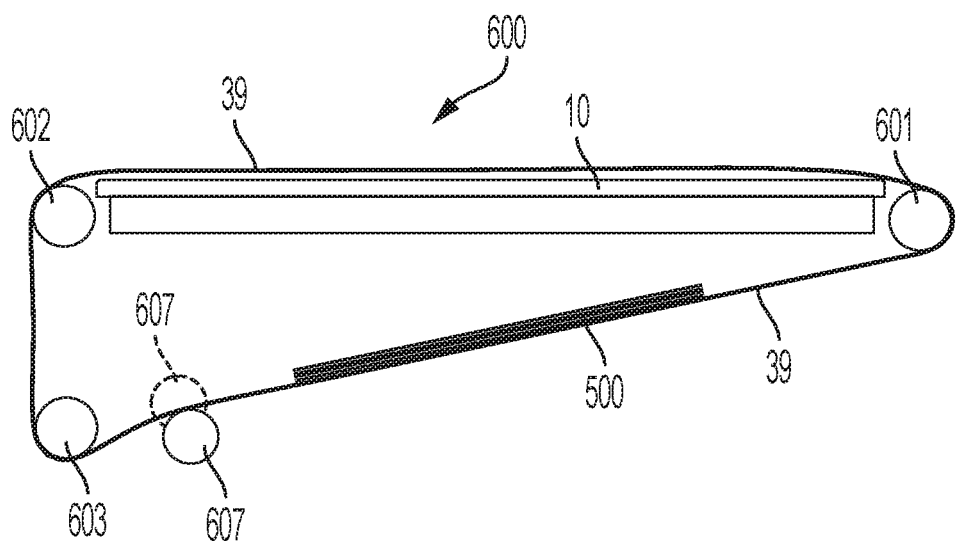
Figure 6F:
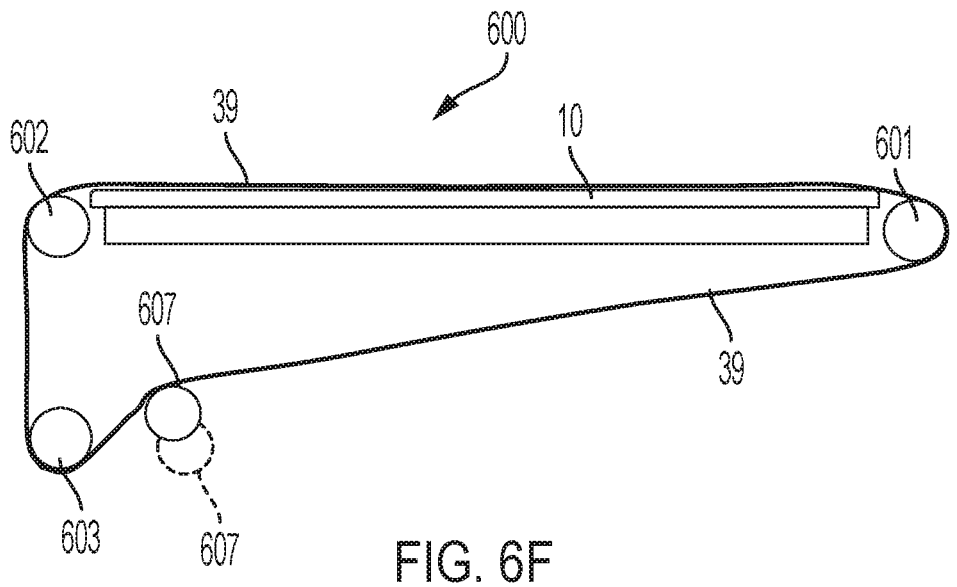

Referring to FIG. 6B, illustrated is the cleaning pad moving around a first roller 601 (i.e., steering roll) and beginning its movement onto the platen 10. In FIG. 6C, the cleaning pad 500 is shown being drawn over the platen 10 by the transport belt 39 toward a second roller 602 (i.e., idler roll). Referring to FIG. 6D, the cleaning pad 500 is shown moving over the second roller 602 and a third roller 603 (i.e., drive roll). Referring to FIG. 6E, the cleaning pad 500 is shown being returned to its start position on the transport belt 39, at which point the transport belt 39 can be stopped and the cleaning pad 500 can be removed. Of course, the cleaning pad 500 can be cycled with the transport belt 39 through the rendering device as many times as needed to thoroughly clean the support rollers and platen 10. After the cleaning pad 500 is removed, the tensioning roller 607 can be returned to a position where tension is applied to the transport belt 39. FIG. 6F illustrates the transport belt 39 at operational readiness and under appropriate tension by the tensioning roller 607.

Figure 7:
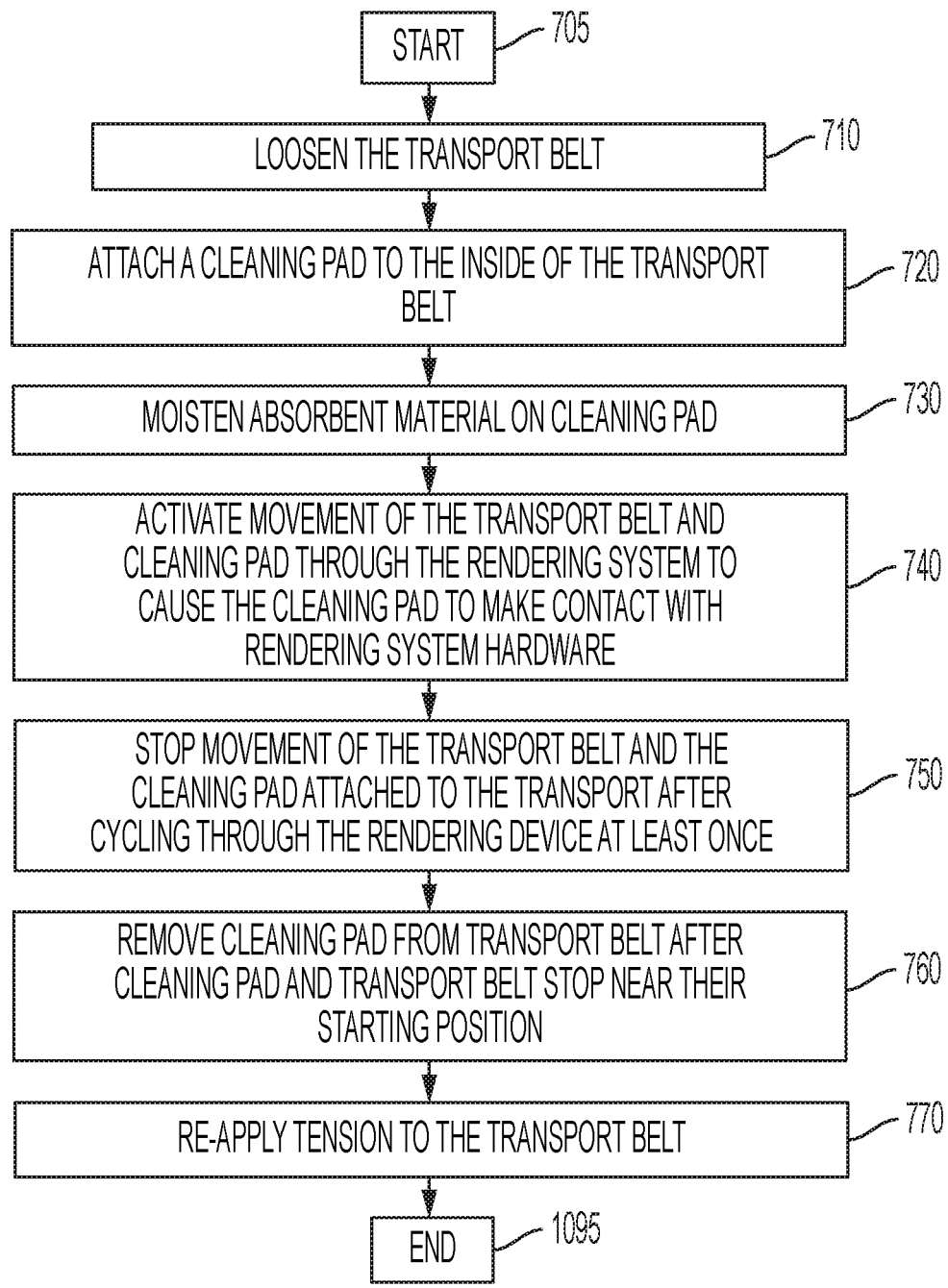
FIG. 7 depicts a flow chart of steps associated with a method for cleaning a rendering device, in accordance with the disclosed embodiments.

Referring to FIG. 7, illustrated is a flow diagram 700 of a method for cleaning of rendering devices by using a cleaning pad, in accordance with the disclosed embodiments. The method begins at Block 705. Referring to Block 710, tension on a transport belt is partially released by loosening a tension roller. Referring to Block 720, a cleaning pad is attached onto the inside of the transport belt. Referring to Block 730, absorbent material on the cleaning pad is moistened with cleaning solution. Movement of the transport belt and the attached cleaning pad is activated causing the cleaning pad to make contact with support wheels, the platen, and hardware typically in contact the transport belt, as shown in Block 740. Then as shown in Block 750, movement of the transport belt and the attached cleaning pad is stopped after cycling through the rendering device at least once. The cleaning pad is removed from the transport belt after it stops (arrives) at its starting position, as shown in Block 760. Then, tension is applied to the transport belt by moving and tightening the tension roller as shown in Block 770.

Based on the foregoing, it can be appreciated that a number of embodiments are disclosed herein. In one embodiment, a system for maintaining rendering systems can be implemented, which can include a marker platen having a top surface and a bottom; a transport belt configured to move over the top surface of the marker platen; and a cleaning pad configured to be affixed to the transport belt and move along the rendering device hardware, including support rollers and the marking platens, to remove ink and debris.

In an embodiment, the cleaning pad can be provided as part of a system for cleaning support rollers and marking platens within a rendering machine without removing a marker belt, which can be accomplished by affixing a cleaning pad to the inside surface of a transport belt and cycling the transport belt through its typical path within a rendering system to pull the pad over support rollers and across a top surface of a marker platen.

In another embodiment, a cleaning pad can be provided that can include multiple absorbent pads sections along the length of the pad.

In another embodiment, a cleaning pad can be provided that can include multiple absorbent pads sections along the length of the pad and includes an elastomer blade disposed between a lead pad and a drying pad.

In another embodiment, a cleaning pad can be configured to be attached to an inner surface of the transport belt and move along a path followed by the transport belt to remove ink from at least one of support rollers and a top surface of a marker platen typically contacted by the transport belt during operation within a rendering device, and include a means to attach the cleaning pad to the inner surface of the transport belt.

In another embodiment, a cleaning pad can include a base sheet including a bottom surface and a top surface and further comprises protrusions extending from the bottom surface serving as the means to attach the cleaning pad to the inner surface of the transport belt, wherein the protrusions are configured to be attached to holes formed in the inner surface of the transport belt.

In another embodiment, a base sheet of a cleaning pad can include a lead pad further comprising a rough texture formed as a surface over an absorbent pad material sandwiched between the rough texture and the base sheet.

In another embodiment, a cleaning pad can include a base sheet having a bottom surface and a top surface and wherein the base sheet further comprises a scraping blade can be affixed to the top surface of the base sheet between a lead pad comprised of absorbent material and a second pad composed of more absorbent material that is adapted to accept cleaning fluid therein.

In another embodiment, a cleaning pad can include a scraping blade comprising of a polyurethane material, wherein the scraping blade is mounted to the base sheet between a lead pad and a second pad.

In another embodiment, a cleaning pad can include a drying pad located on a base sheet, just after placement of a second pad, wherein the drying pad is configured to wipe and dry components that a lead pad and the second pad contact with cleaning fluid.

In accordance with another embodiment, a method for cleaning a rendering device can include: attaching a cleaning pad including absorbent material onto an inside surface of the transport belt; moistening the absorbent material located on the cleaning pad; activating movement of the transport belt and the cleaning pad through the rendering system to cause the cleaning pad to make contact with rendering system hardware; stopping movement of the transport belt and the cleaning pad attached to the transport after cycling through hardware components of the rendering device including support rollers and a marking platen; removing the cleaning pad from the transport belt after the cleaning pad and the transport belt are stopped.

It will be appreciated that variations of the above-disclosed and other features and functions, or alternatives thereof, may be desirably combined into many other different systems or applications. It will also be appreciated that various presently unforeseen or unanticipated alternatives, modifications, variations or improvements therein may be subsequently made by those skilled in the art which are also intended to be encompassed by the following claims.

What is claimed is:

1. A method for cleaning hardware components of a rendering system comprising:
    attaching a cleaning pad including an absorbent material onto an inner surface of a transport belt;
    moistening the absorbent material located on the cleaning pad;
    cleaning hardware components of a rendering system by activating movement of the transport belt and the cleaning pad through the rendering system to cause the moistened absorbent material of the cleaning pad to contact the hardware components, wherein the hardware components comprise support rollers and a marking platen;
    stopping the movement of the transport belt and the cleaning pad attached to the transport belt after cycling through the hardware components of the rendering system; and removing the cleaning pad from the transport belt after the cleaning pad and the transport belt are stopped.

2. The method of claim 1, wherein movement of the transport belt is stopped after the transport belt and the cleaning pad have completed one full revolution within the rendering system.

3. The method of claim 1, further comprising the steps of:
loosening a tension of the transport belt in the rendering system before attaching the cleaning pad including the absorbent material onto an inner surface of the transport belt; and
reapplying tension to the transport belt after removing the cleaning pad from the transport belt.

4. The method of claim 1, wherein the cleaning pad is attached to the inner surface of the transport belt with at least one of: a tape, an adhesive, and protrusions extending from the cleaning pad which to interface with holes formed in the transport belt.

5. The method of claim 1 wherein the rendering system comprises a printer.

6. The method of claim 1 wherein the transport belt comprises a marker belt.

7. The method of claim 1, wherein the transport belt is in contact with the support rollers.

8. The method of claim 1, wherein the cleaning pad further comprises a base sheet comprising a pliable material.

9. The method of claim 5, wherein the printer comprises a digital printing machine.

* * * * *